United States Patent [19]
Koizumi et al.

[11] Patent Number: 4,956,139
[45] Date of Patent: Sep. 11, 1990

[54] METHOD OF PRODUCING AN EXPOSURE BLADE

[75] Inventors: Hiroshi Koizumi, Hanno; Hideaki Kawata, Chichibu; Katsumi Arai, Saitama; Koji Miyamoto, Chichibu; Tadaaki Ichikawa, Saitama; Koji Ogata, Saitama, all of Japan

[73] Assignee: Canon Denshi Kabushiki Kaisha, Tokyo, Japan

[21] Appl. No.: 105,017

[22] Filed: Oct. 6, 1987

[51] Int. Cl.⁵ ............... B29C 45/14; B29C 45/36; B29L 31/0
[52] U.S. Cl. ................... 264/156; 29/527.4; 29/530; 264/154; 264/266; 264/273; 264/274; 264/294; 264/247; 264/328.11; 425/112; 425/121; 425/290; 425/298; 425/DIG. 37; 425/554
[58] Field of Search ............ 264/273, 153, 156, 266, 264/154, 155, 273, 294, 163, 138, 247, 274, 272.14, 272.15, 272.16, 271.1, 328.8, 328.11; 29/156.8 B, 460, 527.4, 527.5, 530; 425/112, 290, 121, 298, DIG. 37, 554

[56] References Cited

U.S. PATENT DOCUMENTS

| | | | |
|---|---|---|---|
| 2,688,581 | 9/1954 | Stubbs | 264/273 |
| 3,077,658 | 2/1963 | Wharton | 264/156 |
| 3,366,512 | 1/1968 | Jammet | 264/273 X |
| 3,890,679 | 6/1975 | Simon | 264/273 X |
| 3,952,402 | 4/1976 | Mengeringhausen | 264/156 X R |
| 4,135,297 | 1/1979 | Guttenberger et al. | 29/527.4 |
| 4,202,091 | 5/1980 | Ohnishi | 264/273 |
| 4,230,659 | 10/1980 | Sutch | 264/130 |

FOREIGN PATENT DOCUMENTS

56-134023 7/1981 Japan .
56-134023 10/1981 Japan .

Primary Examiner—Jeffery Thurlow
Assistant Examiner—Mathieu Vargot
Attorney, Agent, or Firm—Fitzpatrick, Cella, Harper & Scinto

[57] ABSTRACT

A blade of an exposure control such as an iris control device or a shutter control device is provided for use in cameras. A sheet of a resin or metallic material configured as desired into the final blade form is placed in an injection molding machine which has a pin-forming cavity on one side of the sheet. The sheet is broken and penetrated at its portions where pins are to be formed and fixed, such that portions of the material of the sheet are deformed to project into the cavity. A molten resin is injected through a sprue formed on the opposite side of the sheet to the cavity so that the injected resin fills the cavity to form a pin in such a manner that the deformed and projected portion of the material of the sheet is embedded in the pin-forming resin. Another pin is formed on the other side of the sheet simultaneously with the first-mentioned pin in the same manner in the same die apparatus.

1 Claim, 8 Drawing Sheets

FIG. 10-III

FIG. 11

ENLARGED A-A SECTION

ENLARGED B-B SECTION

METHOD OF PRODUCING AN EXPOSURE BLADE

BACKGROUND OF THE INVENTION

1. Field of the Invention

The present invention relates to an exposure controlling blade for use in silver-chloride-type cameras and magnetic recording cameras and adapted for controlling apertures or shutters in such cameras. More particularly, the present invention is concerned with the construction of pins which are fixed to each blade of the exposure controlling blade device for the purpose of controlling the rotational movement of the blade. Still more particularly, the invention is concerned with an art for fixing such pins to the blade for the exposure controlling.

2. Related Background Art

In a typical conventional technique for fixing pins to each blade of an exposure controlling blade, the pins are fixed by caulking to the blade which is made of a suitable material such as an SK steel, duralumin or a polyester resin. It has also been a known practice to fix pins made from a plastic material by melting and welding the same to each blade of the exposure controlling blade device. Such fixing methods are disclosed, for example, in Japanese Utility Model Laid-Open No. 134023/1981.

These known fixing methods, however, are disadvantageous in that the blades in the exposure controlling blade device which make sliding contact with one another at their surfaces tend to be damaged by protrusions which are inevitably formed on each blade as a result of the caulking or fusion welding when the pins are fixed to each blade. The protrusion on each blade also impairs the flatness or smoothness of the plane of the surfaces of each blade, resulting in troubles such as, for example, deterioration in the precision of aperture diameter particularly when the aperture diameter is small.

SUMMARY OF THE INVENTION

Accordingly, a primary object of the present invention is to provide a novel construction of blades for an exposure controlling suitable for use in silver-chloride-type cameras, as well as in magnetic recording cameras.

The exposure controlling blade device to which the invention pertains has a plurality of blades which are adapted to be rotated about respective pins so as to determine, when it is applied to the control of the aperture of a camera, the diameter of the aperture.

One of the practical objects of the invention is to provide a novel technique for fixing pins to each blade of the exposure controlling apparatus of the type mentioned above.

To this end, the invention provides a method in which pins are fixed to an aperture control blade which is prepared in a sheet-like form from a plastic material. The invention also provides a method in which pins are made from a plastic and are fixed to a blade by injection molding.

The invention also provides a method in which pins are fixed to a sheet-like blank of a blade in which the sheet-like blank is fed to a pin forming machine in which, while the pin is being formed, the sheet-like blank is punched into the form of a blade.

The above and other objects, features and advantages of the present invention will become clear from the following description of the preferred embodiments when the same is read in conjunction with the accompanying drawings.

BRIEF DESCRIPTION OF THE DRAWINGS

FIGS. 10-I, 10-II and 10-III are sectional views illustrating the positional relationship between dies and the blade blank shown in FIG. 9;

DESCRIPTION OF THE PREFERRED EMBODIMENTS

Figure 1:
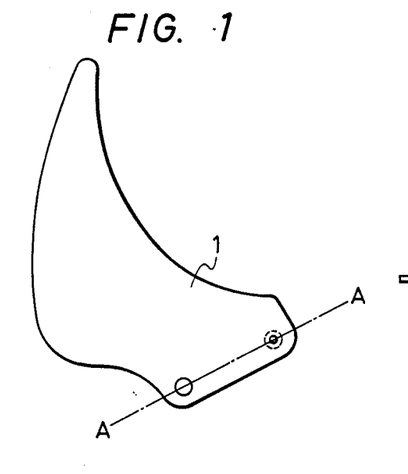
FIG. 1 is a plan view of a blade incorporated in an exposure controlling blade device.
Figure 2:
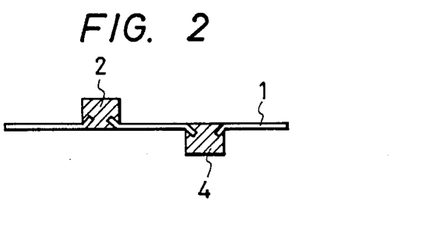
FIG. 2 is a sectional view taken along the line A—A of FIG. 1.
Figure 3:
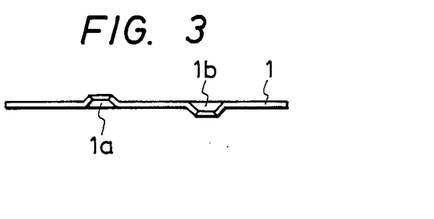
FIG. 3 is a sectional view of a blade.
Figure 4:
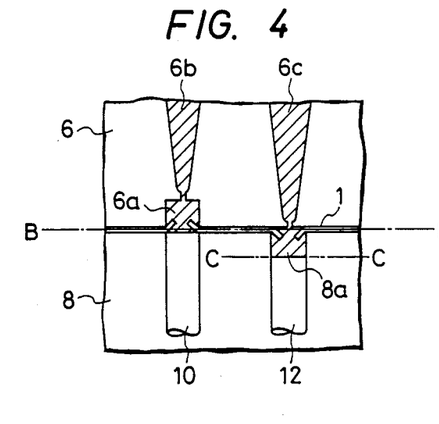
FIG. 4 is an illustration of a mold.

FIG. 1 is a plan view of a blade incorporated in an aperture controlling blade device. As shown in FIG. 2, the blade denoted by 1 have dowels or pins 2 and 4 which engage, respectively, a cam member and a blade holding member which are disposed on the upper and lower sides of the blade 1. More particularly, the pins 2 and 4 engage, respectively, with a cam groove formed in the cam member and an engaging hole formed in the blade holding member. FIG. 3 is a sectional view of the blade taken along the line A—A of FIG. 1. Holes 1a and 1b are formed by, for example, burring at the positions where the pins 2 and 4 are to be fixed, such that the holes 1a and 1b have walls which are inclined with respect to the plane of the blade FIG. 4 illustrates an example of the operation for fixing the pins 2 and 4 in the holes 1a and 1b of the blade 1. The operation is conducted by employing a fixed die plate 6 which has a cavity 6a contoured in conformity with the configuration of the pin, an injection sprue 6b for forming the pin 2 and another injection sprue 6c for forming the pin 4, and also a movable die plate 8 which has a cavity 8a contoured in conformity with the configuration of the pin 4.

A reference numeral 10 denotes an ejector pin which is movable as a unit with the movable die plate 8. The ejector pin 10 is so sized and mounted that its top end surface is flush with the plane of the lower surface of the blade 1, when the movable die plate 8 has been brought to closing position where it holds the blade 1 in cooperation with the stationary die plate 6.

In this state, the tip surface of another ejector pin 12 is positioned at a level C—C which is below the plane B—B of the upper surface of the movable die plate 8, so as to define a cavity 8a for the pin 4, in cooperation with the peripheral wall of the cavity 8a in the movable die plate 8.

In operation, an injection gate (not shown) is connected to the sprues 6b and 6c of the dies shown in FIG. 4 and a material such as a polyester resin is injected from an injection cylinder. The injected material is forcibly charged into the cavities 6a and 8a through the injection gate and the sprues 6b and 6c. The thus injected material fills the spaces in the cavities such that the inclined walls of the holes 1a, 1b formed in the blade 1 are embedded in the injected material. Then, cooling, die parting and ejecting operations are conducted in a manner known per se, whereby a blade with pins 2 and 4 fixed thereto is obtained as shown in FIG. 2. The blade may be made of any one of suitable materials which include, for example, metals such as an SK steel, aluminum and duralumin, as well as a sheet-like plastic material such as a sheet of polyester plated at its surfaces.

Figure 5:
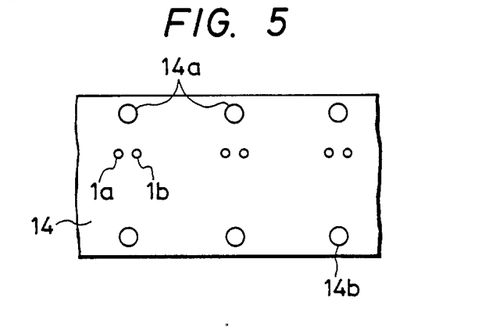
FIG. 5 is an illustration of a hoop material.

FIG. 5 shows another example in which a plurality of blades are successively formed from a hoop material. According to this method, an elongated sheet or hoop 14 of a polyester resin, having a width large enough to cover the greater dimension of a shutter blade is suitably perforated at a predetermined pitch so as to provide pilot holes 14a and 14b. Holes 1a, 1b with projected walls are then formed by burring as explained before.

The hoop material shown in FIG. 5 is fed to a die apparatus which may be similar to that shown in FIG. 4 so as to form and fix pins 2 and 4 in the holes 1a and 1b of the blade 1 in the same manner as that explained before. In synchronism with the formation and fixing of the pins 2 and 4, the hoop material is punched to separate successive pieces of blades having the final form.

According to the described method, the injected resinous material well fills the space within and around the projected walls of the holes 1a, 1b in the aperture blade or the shutter blade so as to firmly embed and hold the pins. In addition, the construction of the apparatus is simplified as compared with that of the conventional apparatus which relies upon mechanical caulking and the production cost can be reduced appreciably. In particular, the method explained in connection with FIG. 5 makes it possible to produce the blades with pins continuously, thus remarkably shortening the production time per blade piece.

Another embodiment of the method for fixing pins to a blade will be explained with reference to FIGS. 6A to 9.

Figure 6A:
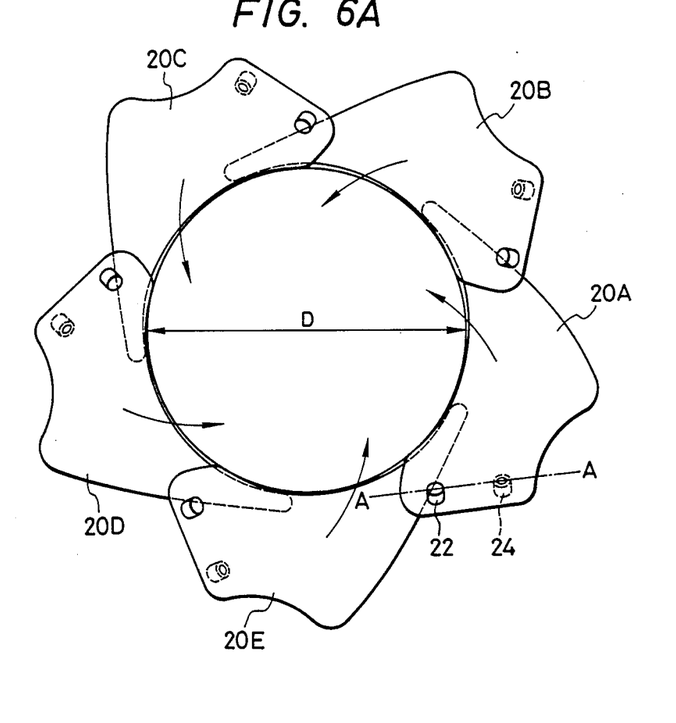
FIG. 6A is an illustration of an aperture control device.
Figure 6B:
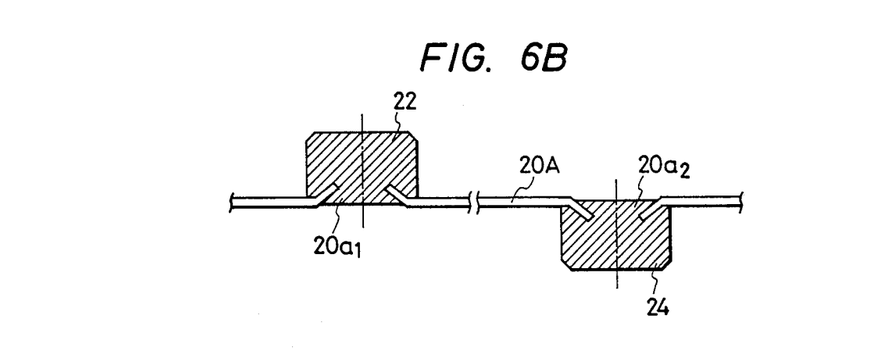
FIG. 6B is a sectional view taken along the line A—A of FIG. 6A.

FIGS. 6A and 6B show an aperture control blade device which employs a combination of five blades 20A, 20B, 20C, 20D and 20E which are assembled to define an exposing aperture of a diameter D. Dowels or pins 22 and 24 are fixed to the upper and lower sides of each blade. The aperture control blades 20A to 20E are sandwiched between an aperture controlling cam member and a blade holding member; both are omitted from the drawings. Any further detail of the aperture control blade device is omitted because it is well known to those skilled in the art.

Figure 7A:
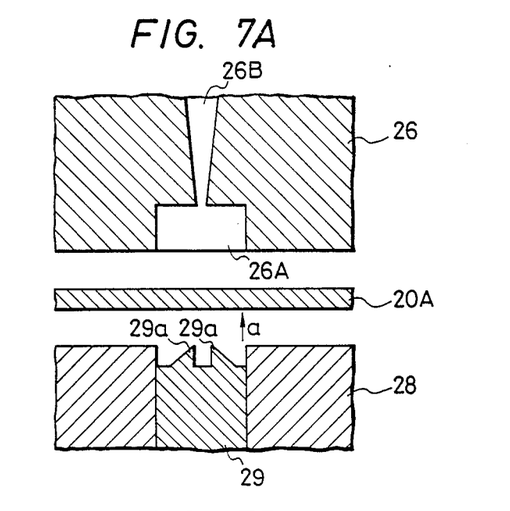
FIGS. 7A and 7B are illustrations of a die construction.
Figure 7B:
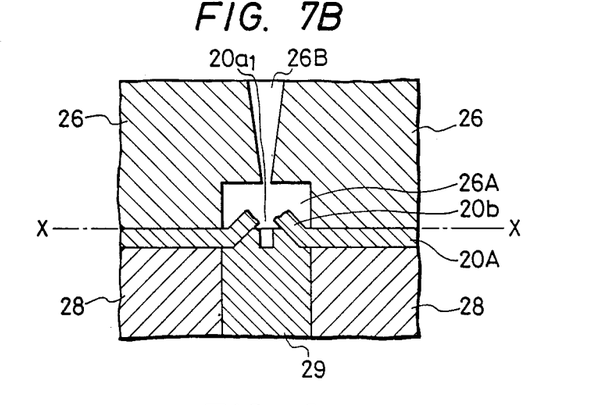

FIGS. 7A and 7B show the one 20A of the blades of the aperture control blade device, taken along the line A—A in FIG. 6A. As will be seen from these FIGS. holes $20a_1$ and $20a_2$ (see FIG. 6B) are formed in the portions of the blade 20A where the pins 22 and 24 are to be fixed, and the pins 22 and 24 are formed and fixed on the blade 20A by a resin material injected in such a manner as to embed the walls.

The operation for forming and fixing the pins 22 and 24 will be explained hereinunder with reference to FIGS. 7A and 7B. Although only the pin 22 is mentioned in the following description, it will be understood that the same process can be applied to the formation and fixing of the other pin 24.

The operation is conducted by employing a die apparatus including a stationary die plate 26 and a movable die plate 28, as well as an ejector pin 29. The stationary die plate 26 has a cavity 26A formed therein at a position where the pin 22 is to be formed and fixed on the upper side of the blade, and a sprue 26B constituting a passage for the injection of the resin material.

The movable die plate 28 is movable along a guide (not shown) towards and away from the stationary die plate 26 so as to clamp and unclamp between itself and the stationary die plate 26.

The exposure control blades 20A to 20E are made of a resin material. More specifically, a polyester resin is used in this embodiment as the material of the blades 20A to 20E. The ejector pin 29 is so arranged that it can slide into the hole formed in the movable die plate 28. The ejector pin 29 is provided on the top surface thereof with a pair of projections 29a, 29a as will be best seen from FIG. 8. These projections 29a, 29a have top edges suitable for breaking and penetrating the blade 20A in a manner shown in FIG. 7B.

In operation, the movable die plate 28 and the ejector pin 29 are moved as a unit towards the stationary die plate 26, after placing the exposure control blade 20A between the stationary and movable die plates 26, and 28, respectively thereby to close the die apparatus. Immediately before the completion of the die closing operation, the blade 20A is fixedly clamped between the stationary die plate 26 and the movable die plate 28 and, thereafter, the ejector pin 29 is moved in the direction of an arrow a in FIG. 7A, so that the blade 20A is broken and penetrated by the end projections 29a, 29a on the top end of the ejector pin 29. In consequence, the material of the blade 20A is plastically deformed upward so as to provide a peripheral wall which defines the hole $20a_1$ and which is inclined with respect to the plane X—X of the blade so as to project into the die cavity 26A.

Thus, the blade 20A with holes defined by projecting walls is fixed between the stationary and movable die plates 26 and 28 as shown in FIG. 7B. Thereafter, an injection cylinder (not shown) is operated to inject polyethylene resin into the cavity 26A through the sprue 26B, thereby forming the pin 22.

The resin injected into the cavity 26A, which may be a polyethylene resin, well fills the space around the projected wall of each hole $20a_1$, in such a manner that the projected wall is firmly embedded in the injected resin.

Subsequently, steps are followed such as cooling of the dies and parting of the die plates which are conducted in a manner known per se, thus completing the injection molding. It will be seen that the blade, when taken out from the die apparatus, has pins 22 and 24 which are integrally fixed thereto.

Although the formation of one 22 of the pins has been described, it will be clear to those skilled in the art that the blade 20A having the pin 22 on one side and another pin 24 on the other side as shown in FIG. 6B can be produced by using a die apparatus which is substantially the same as that explained above except that a second cavity for forming the pin 24 is formed in the movable die plate 28 and that a second ejector pin for breaking and penetrating the blade 20A is provided on the stationary die plate 26. Needless to say, a second sprue (not shown) is connected to the second cavity. In operation, when the movable die plate 28 is brought closer to the stationary die plate 26, the second ejector pin also breaks and penetrates the blade 20A so as to form a projected wall defining the hole $20b_1$ and projecting into the second cavity formed in the movable die plate 28. Then, the resin material is injected into this cavity to form the pin 24 in which is embedded the projected wall.

Figure 8:
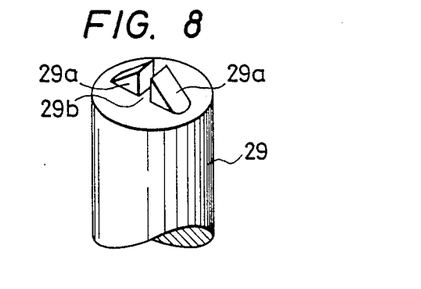
FIG. 8 is a perspective view of an ejector pin.

The projections 29a, 29a on the top surface of the ejector pin 29 may be formed as a single projection. It is, however, preferred that a pair of projections 29a, 29a with a slit 29b formed therebetween are formed on the top end of the ejector pin because such a slit 29b is filled with the injected resin to provide a greater anchoring force.

In this embodiment, as will be understood from the foregoing description, the pins 22 and 24 are formed on and fixed to the blade by injection molding in such a manner that the projected walls formed as a result of formation of the holes $20a_1$ and $20b_2$ embedded in the injected resin, whereby the pins 22 and 24 are firmly fixed to the blade.

In addition, the formation of holes with projected walls are conducted during the die closing operation, by virtue of the projections formed on the top end of the ejector pin and adapted to break and penetrate the material of the blade. In consequence, the pin fixing process is simplified and the time required for fixing the pins can be shortened while remarkably reducing the production cost, as compared with conventional methods which essentially employing separate steps: namely, a step for forming the holes in the blade and a step for fixing pins by caulking or fusion welding.

Figure 9:
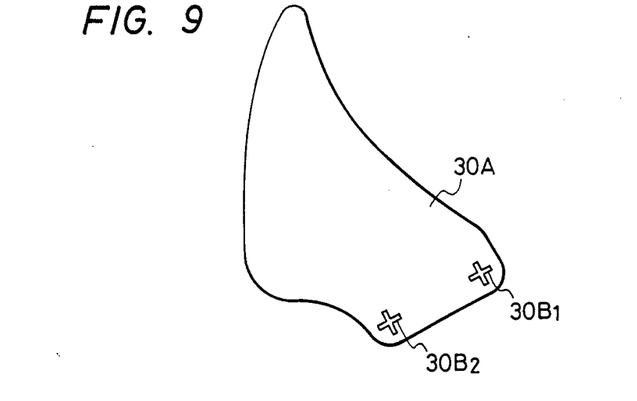
FIG. 9 is a plan view of a blade blank in a state before formation of a dowel.
Figures 1, 10:
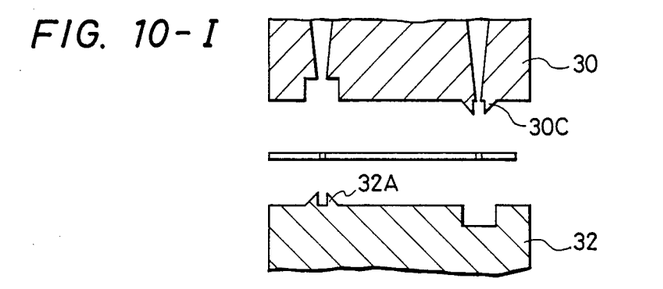
Figures 2, 10:
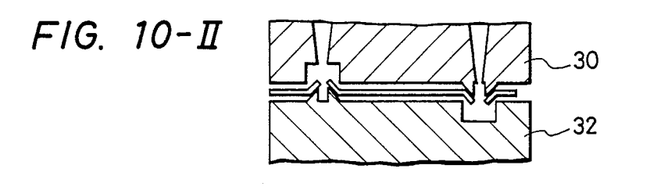
Figures 3, 10:
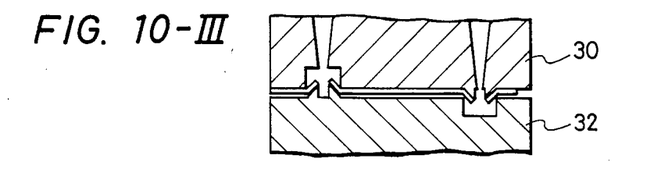
Figure 11:
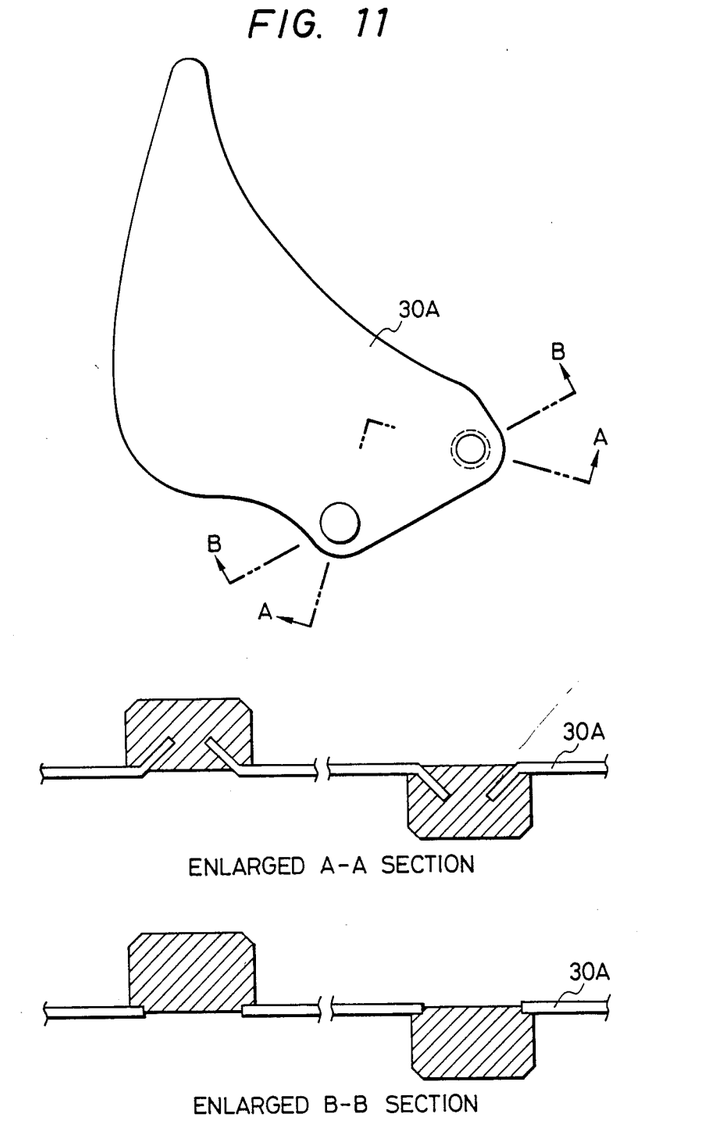
FIG. 11 is an illustration of an exposure controlling blade in accordance with the present invention.

Still another embodiment will be explained in connection with FIGS. 9 to 11. This embodiment is characterized in that slits are formed in the blade material prior to the formation of the pins. FIG. 9 shows a blade which is beforehand provided with slits $30B_1$ and $30B_2$ formed therein, while FIGS. 10-I to 10-III show successive states of a die apparatus used in this embodiment, in relation to the blade shown in FIG. 9. The die apparatus includes a die plate 30 provided at its portions corresponding to the slits $30B_1$ and $30B_2$ of the blade with sprues which constitute passages for the resin to be injected. A projection 30C is formed on the underside of the die plate 30 so as to project downward from the peripheral portion of an opening of one of the sprues. The portion of the underside of the die plate 30 where the other sprue opens is recessed so as to provide a cavity. Another die plate 32 adapted for cooperating with the die plate 30 has a projection at its portion corresponding to the cavity in the die plate 30 and a cavity formed at its portion corresponding to the projection 30C on the die plate 30. The die plate 32, however, is devoid of sprues. FIG. 11 shows, in plan and in section, a blade of an exposure control device formed by the embodiment explained in connection with FIGS. 9 and 10-I to 10-III.

The process is as follows. As the first step, slits are formed in predetermined portions of the blade as shown in FIG. 9. Then, the blade with the slits is placed between the die plates as shown in FIG. 10-I. Subsequently, the die plate 30 or 32 is actuated in a sequence as shown in FIGS. 10-II and 10-III so that the portions of the blade material around the slits are deformed to project into the respective cavities in the die plates. Thereafter, a resin material is injected through the respective sprues into the associated cavities, so that the injected resin fills the spaces around the respective projected portions of the blade around the slits. Then, after a suitable cooling period, the die plates 30 or 32 is moved away from the other, whereby the blade of an exposure control device is obtained as shown in FIG. 11.

Although in the illustrated embodiment each slit has a cross-like form, this is not exclusive and the slit can have any desired shape provided that it ensures that at least a portion of the material of the blade is deformed and projected into the die cavity so as to be embedded in the resin injected into the die cavity.

Thus, in the embodiment explained in connection with FIGS. 9 to 11, it is possible to attain a large anchoring force for anchoring the pins without requiring any drilling in the blade material, because the anchoring portion of the blade is formed simply by slitting. The anchoring force is greater than that obtained by conventional methods such as caulking and fusion welding. In addition, the construction of the apparatus for forming and fixing pins on the blade is simplified as compared with the conventionally-used material which is designed to conduct, for example, caulking on the blade material, thus remarkably reducing the production cost.

Figure 12A:
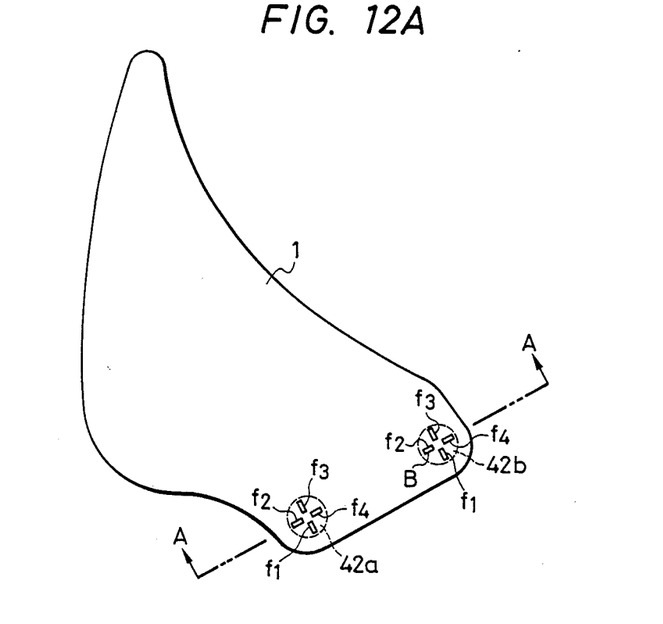
FIG. 12A is a plan view of the blade in accordance with the present invention.
Figure 12B:
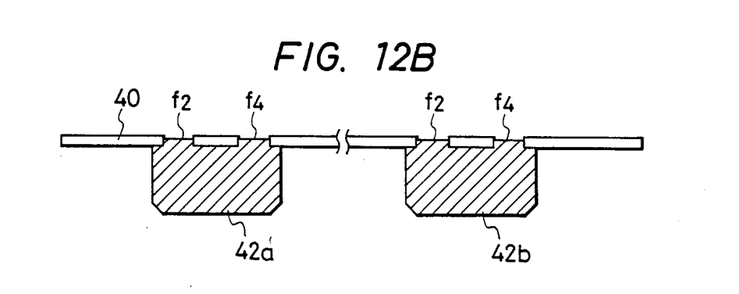
FIG. 12B is a sectional view taken along the line A—A of FIG. 12A.
Figure 13:
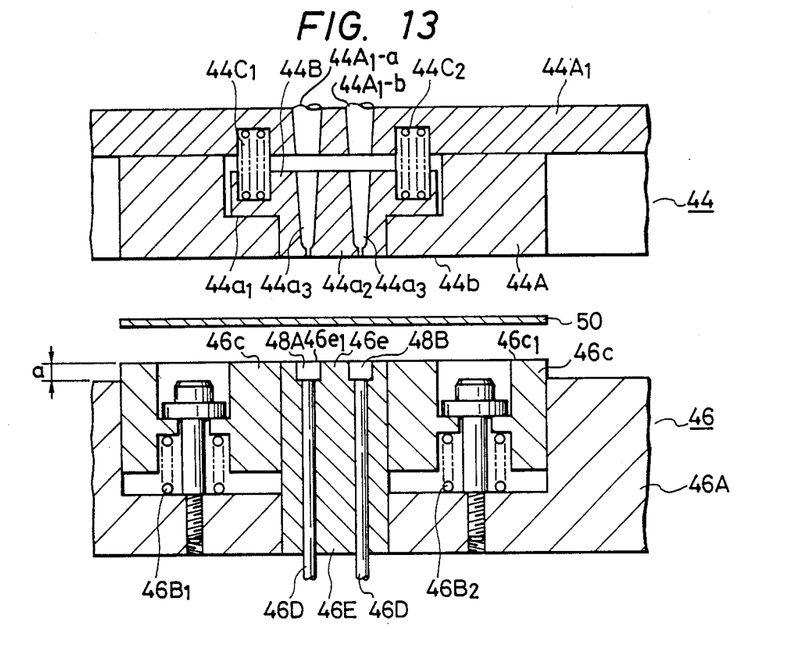
FIG. 13 is a sectional view of an essential portion of dies in open state.
Figure 14:
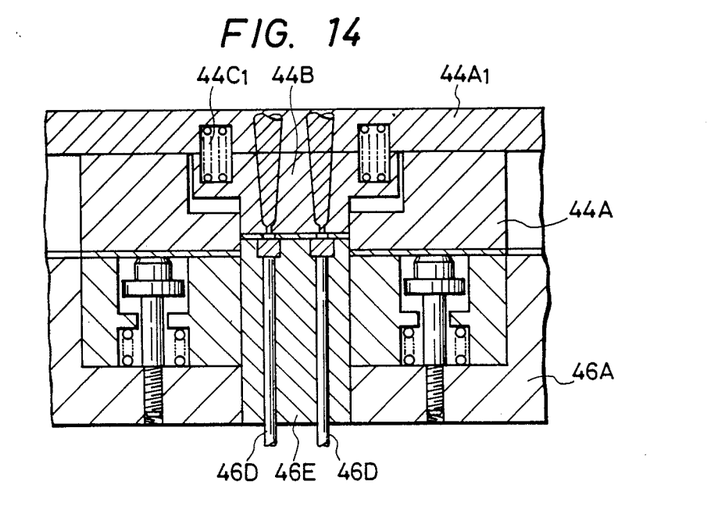
FIG. 14 is an illustration of a process for forming pins.

FIGS. 12 to 14 in combination show a further embodiment in which a sheet material is continuously fed into a forming machine and pieces of blades are successively punched out from the sheet, the successive pieces of blade are then sent to a step for forming pins thereon.

FIG. 12A is a plan view of a blade used in an exposure controlling blade device. The blade, denoted by reference numeral 40, is provided with a pair of dowels or pins 42a, 42b which function to rotate the blade 40. As is well known to those skilled in the art, a plurality of such blades are assembled together so as to form an iris-type aperture.

FIG. 12B is a sectional view taken along the line A—A of FIG. 12A.

The formation and fixing of pins 42a, 42b on the blade 40 is conducted by employing a die apparatus as shown in FIG. 13. Namely, the die apparatus has a stationary die plate 44 which includes a stationary die 44A, a movable die 44B and springs $44C_1$ and $44C_2$ for downwardly urging the movable die 44B. The movable die 44B urged by the springs $44C_1$ and $44C_2$ are pressed onto a step $44a_1$ on the stationary die 44A. In this state, as shown in FIG. 13, the lower surface $44a_2$ of the movable die 44B is flush with the lower surface $44b_2$ of the stationary die 44A. In addition, the movable die 44B is provided with sprues $44a_3$ and $44a_3$.

The die apparatus also has a movable die plate 46 which has a first movable die 46A and a second movable die 46C which is received in a recess formed in the first movable die 46A and upwardly urged by springs $46B_1$ and $46B_2$. The second movable die 46C is provided with a punch 46E fitting in the recess formed in the second movable die 46C and holding ejector pins 46D, 46D.

When the die apparatus is in the open state as shown in FIG. 13, the lower surface $44_2$ of the movable die 44B is flush with the lower surface $44b_2$ of the stationary die 44A, as explained before, by virtue of the downward urging force exerted by the springs $44C_1$ and $44C_2$ on the movable die 44B.

In the movable die plate 46, the springs $46B_1$ and $46B_2$ urge the second movable die 46C upward such that the upper surface $46C_1$ of the second movable die 46C is positioned at a level which is higher by a than the upper surface of the first movable die 46A, but is flush with the upper surface $46e_1$ of the punch 46E. The upper end portions of the bore formed in the punch 46E receiving the ejector pins 46D, 46D have enlarged diameters so as to form recesses which, in cooperation with the top surfaces of the ejector pins 46D, 46D, form cavities 48A and 48B.

A reference numeral 50 in FIG. 13 denotes a sheet material made from a polyester resin. The sheet material 50 is placed between the stationary die plate 44 and the movable die plate 46 as illustrated.

As will be seen from FIG. 12A, the sheet material 50 has four slits $f_1$, $f_2$, $f_3$, and $f_4$ around the center of the position where each of the pins 42a and 42b is to be fixed.

In operation, the sheet material 50 is fed into the space between the stationary die plate 44 and the movable die plate 46 such that the centers of each group of slits $f_1$ to $f_4$ are aligned with the center of the corresponding cavity 48A, 48B.

Then, a suitable die closing apparatus (not shown) is actuated so as to close the die apparatus. When the die closing operation is finished, the sheet material is clamped between the stationary die plate 44 and the movable die plate 46, more specifically between the lower surfaces $44a_2$ and $44b$ of the stationary die 44A and the movable die 44B and the upper surfaces 46c and 46e of the second movable die 46C and the punch 46E.

During this clamping operation, the second movable die 46C is pressed downward overcoming the force of the springs $46B_1$ and $46B_2$. The movable die 44B also is pressed upward against the force of the springs $44c_1$ and $44c_2$. This in turn causes a shearing action on the sheet material 50 at the boundary between the punch 46E and the second movable die 46C, whereby the sheet material 50 is punched by shearing into the form of the blade as shown in FIG. 12A. The shearing action will be more clearly understood from FIG. 14. In consequence, the blade punched out from the sheet material 50 is clamped between the lower surface of the movable die 44B and the upper surface 46e of the punch 46E.

In this state, the movable die 44B contacts the underside of a stationary plate $44A_1$ of the stationary die plate 44, with the sprues $44a_3$ and $44a_3$ in the movable die 44B communicating with sprues $44A_1$-a and $44A_1$-b formed in the stationary plate $44A_1$. It is also to be understood that the slits $f_1$ to $f_4$ of each group in the blade 40 are located around the center of the corresponding cavity 48A, 48B.

Then, a resin material such as polyester resin is injected into the cavities 48A, 48B through the respective sprues, by means of an injection cylinder which is not shown. The thus injected resin material fills the cavities so as to form pins. If the sheet material 50 is made from a polyester resin as mentioned hereinabove, the injection of the resin material forming the pins can be performed so as to melt portions of the sheet. This integrally fixes the pins to the sheet. The blade thus provided with the pins formed and fixed thereon is taken out of the die apparatus after a cooling period.

As shown in the sectional view shown in FIG. 12B, the resin material of the pins 42a, 42b fills the spaces in each slit $f_1$ to $f_4$ so that the injected resin is united with the portion of the blade 40 around the slits $f_1$ to $f_4$ thereby to firmly fix the pins 42a and 42b to the blade 40.

This advantageous effect also can be produced when the blade is made of a different material, e.g., a metal. Namely, the injected resin fills the slits $f_1$ to $f_4$ so as to produce a large anchoring force for fixing the formed pins on the metallic blade.

As will be understood from the foregoing description, the embodiment shown in FIGS. 12A to 14 enable pins to be formed and fixed on the blade by injection molding. This in turn increases the degree of freedom of design of the pins and makes it possible to reduce the production cost by adopting a large-lot production. The blade with pins formed and fixed by the described method has a reduced weight as compared with blades formed by known processes, thus contributing to an improvement in the performance of the exposure control unit, due to reduced mass and, hence, reduced inertia.

FIGS. 15A to 15D show a further embodiment of the method in accordance with the present invention for forming and fixing pins on a blade of an exposure control blade device.

Figure 15A:
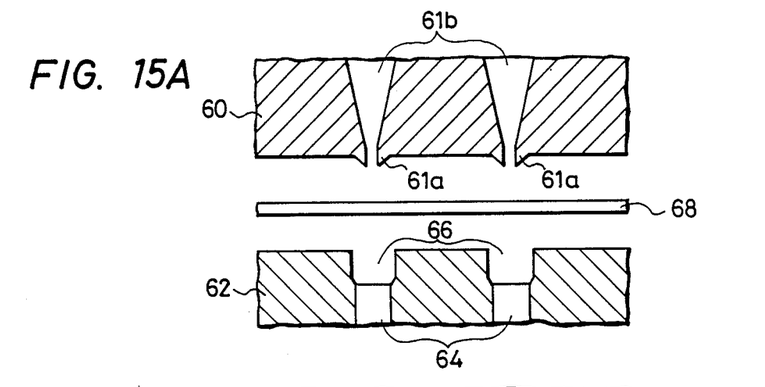
FIG. 15A is an illustration of dies in an open state.
Figure 15B:
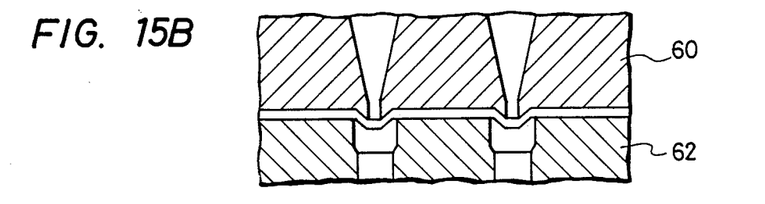
FIGS. 15B to 15D are illustrations of different steps of a process for forming pins.
Figure 15C:
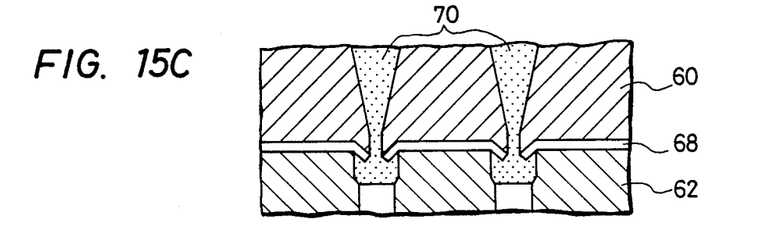

This method employs a die apparatus which includes, as shown in FIG. 15A, a die plate 60 having a plurality of projections 61a for pressing and holding a blade, a die plate 62, and ejector pins 64. The portions of the upper surface of the die plate 62 where the bores receiving the ejector pins 64 are opened are recessed so as to form cavities 66. A sheet material 68 made of a resin is placed between the die plates 60 and 62 and is fixed in the die apparatus in the manner shown in FIG. 15B. Then, a molten resin 70 is injected at a high pressure and velocity through the sprues 61b so that the portions of the sheet material 68 located on the cavities and, hence, having no support are broken by the pressurized resin, whereby the cavities are filled with the injected resin. As will be seen from FIG. 15D, the injected resin fills the spaces around the broken portions of the sheet material 68 such that the fractures of the sheet material are completely embedded in the molten resin, whereby the pins formed by the injected resin are firmly anchored to the sheet material 68.

The described process also can be applied to the case where a metallic material such as aluminum or duralumin is used as the blade material, in place of the resin material. Namely, the molten resin injected at a high pressure penetrates the sheet material to rush into the cavities thereby forming pins which are securely anchored on the sheet material.

Figure 15D:
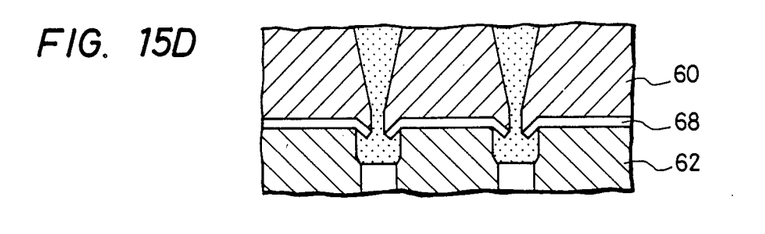

After the formation of the pins as shown in FIG. 15D, the die apparatus is opened to enable the sheet material to be taken out of the die apparatus. The sheet thus provided with pins formed thereon is then subjected to a suitable mechanical process such as punching so that an aperture blade or a shutter blade is punched out from the sheet material.

Needless to say, the invention may be carried out in such a manner that the sheet material is beforehand shaped into the form of a blade and is processed by the die apparatus explained in connection with FIGS. 15A to 15D.

In this embodiment, the number of steps in the process is reduced because the holes in the blade for anchoring the pin are formed by the injection pressure of the molten resin which then fills the cavities so as to form the pins.

We claim:

1. A method for forming a resin pin member on a blade of an exposure controlling apparatus, comprising the steps of:

providing a mold, the mold including a fixed member having a cavity for injecting resin material into the mold and a movable member slidably supporting an ejector pin, the ejector pin having a projection portion having a slit on the top thereof;

clamping the blade between the fixed member and the movable member of the mold, wherein the projecting portion penetrates the blade into the cavity during said clamping step; and injecting the resin material into the cavity, the injected resin material flowing through the penetrated portion of the blade and into the slit for embedding the penetrated portion of the blade, the injected resin material forming the resin pin member upon cooling to form the pin member on the blade.

* * * * *

UNITED STATES PATENT AND TRADEMARK OFFICE
CERTIFICATE OF CORRECTION

PATENT NO. : 4,956,139

DATED : September 11, 1990

INVENTOR(S) : KOIZUMI, ET AL.

It is certified that error appears in the above-identified patent and that said Letters Patent is hereby corrected as shown below:

Title Page:

Between Items [22] and [51]:

Insert:  --[30]  Foreign Application Priority Data
           October  15, 1986 [JP] . . . 61-158494
           October  15, 1986 [JP] . . . 61-158497
           October  15, 1986 [JP] . . . 61-158498
           November 12, 1986 [JP] . . . 61-174506
           November 12, 1986 [JP] . . . 61-270411
           November 12, 1986 [JP] . . . 61-270412
           November 13, 1986 [JP] . . . 61-271463--.

AT [56] References Cited:

"56-134023 7/1981 Japan" should be deleted.

COLUMN 2

Line 42, "have" should read --has--.

COLUMN 4

Line 37, "die plates 26," should read --die plates, 26--.

COLUMN 5

Line 31, "holes 20a, and $20b_2$ embedded should read --holes $20a_1$, and $20a_2$ are embedded--.

UNITED STATES PATENT AND TRADEMARK OFFICE
CERTIFICATE OF CORRECTION

PATENT NO. : 4,956,139

DATED : September 11, 1990

INVENTOR(S) : Koizumi et al

It is certified that error appears in the above-identified patent and that said Letters Patent is hereby corrected as shown below:

COLUMN 8

Line 17, "enable" should read --enables--.

Signed and Sealed this

Twentieth Day of October, 1992

Attest:

DOUGLAS B. COMER

Attesting Officer

Acting Commissioner of Patents and Trademarks